United States Patent
Carames (10) Patent No.: US 10,225,235 B2
(45) Date of Patent: Mar. 5, 2019

(54) NON RFC-COMPLIANT PROTOCOL CLASSIFICATION BASED ON REAL USE

(71) Applicant: SonicWALL Inc., Milpitas, CA (US)

(72) Inventor: Hugo Vazquez Carames, Barcelona (ES)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 15/830,325

(22) Filed: Dec. 4, 2017

(65) Prior Publication Data
US 2018/0159827 A1 Jun. 7, 2018

Related U.S. Application Data

(63) Continuation of application No. 15/434,603, filed on Feb. 16, 2017, now Pat. No. 9,838,357, which is a continuation of application No. 14/666,180, filed on Mar. 23, 2015, now Pat. No. 9,608,959.

(51) Int. Cl.
*H04L 29/06* (2006.01)
*G06F 21/56* (2013.01)

(52) U.S. Cl.
CPC ...... *H04L 63/0236* (2013.01); *H04L 63/0227* (2013.01); *H04L 63/0263* (2013.01); *H04L 63/20* (2013.01); *G06F 21/566* (2013.01); *G06F 21/567* (2013.01); *H04L 63/145* (2013.01); *H04L 63/1416* (2013.01)

(58) Field of Classification Search
None
See application file for complete search history.

(56) References Cited

U.S. PATENT DOCUMENTS 7,310,815 B2 12/2007 Yanovsky
7,545,748 B1 6/2009 Riddle
(Continued)

FOREIGN PATENT DOCUMENTS

EP 1 143 660 10/2001
EP 1143660 A2 * 10/2001 ......... H04L 12/4641

OTHER PUBLICATIONS

U.S. Appl. No. 14/665,315 Office Action dated Oct. 19, 2017.
(Continued)

*Primary Examiner* — Eleni A Shiferaw
*Assistant Examiner* — Andrew J Steinle
(74) *Attorney, Agent, or Firm* — Polsinelli LLP (57) ABSTRACT

A firewall system determines whether a protocol used by an incoming data packet is a standard protocol compliant with Request For Comment (RFC) standards. In the event the protocol is RFC compliant, the firewall transmits the packet to the recipient according to firewall policies regarding the standard protocol. If the protocol is not that of an RFC standard, the firewall determines whether the protocol matches an RFC-exception protocol in a RFC-exception protocol database. If the protocol does match an RFC-exception, the firewall may transmit the packet to the recipient according to firewall policies regarding the RFC-exception protocol. If it does not match an RFC-exception, the firewall may transmit the packet or protocol to a support system where it may be quarantined until it is approved based on a decision that the protocol is safe and/or widely adopted.

20 Claims, 5 Drawing Sheets

(56) References Cited

U.S. PATENT DOCUMENTS

| | | | |
|---|---|---|---|
| 7,620,988 B1* | 11/2009 | Hernacki | H04L 63/0227 713/152 |
| 8,601,114 B1 | 12/2013 | Cooper | |
| 9,485,231 B1 | 11/2016 | Reese | |
| 9,608,959 B2 | 3/2017 | Carames | |
| 9,825,921 B2 | 11/2017 | Reese | |
| 9,838,357 B2 | 12/2017 | Carames | |
| 9,888,011 B2 | 2/2018 | Carames | |
| 2004/0039940 A1 | 2/2004 | Cox et al. | |
| 2005/0010816 A1 | 1/2005 | Yu et al. | |
| 2005/0131997 A1 | 6/2005 | Lewis et al. | |
| 2006/0085850 A1 | 4/2006 | Mayfield et al. | |
| 2007/0271361 A1 | 11/2007 | Abzarian et al. | |
| 2010/0034178 A1 | 2/2010 | Bhar | |
| 2010/0192224 A1 | 7/2010 | Ferri et al. | |
| 2011/0179362 A1 | 7/2011 | Craddock et al. | |
| 2013/0094376 A1* | 4/2013 | Reeves | H04L 43/18 370/252 |
| 2013/0125236 A1 | 5/2013 | Lalonde et al. | |
| 2013/0290404 A1 | 10/2013 | Rajabi et al. | |
| 2013/0291076 A1 | 10/2013 | Duryee et al. | |
| 2014/0344928 A1 | 11/2014 | Sreedharan et al. | |
| 2015/0007312 A1 | 1/2015 | Pidathala et al. | |
| 2015/0074259 A1 | 3/2015 | Ansari et al. | |
| 2015/0101008 A1 | 4/2015 | Zent et al. | |
| 2015/0213259 A1 | 7/2015 | Du et al. | |
| 2015/0288709 A1* | 10/2015 | Singhal | H04L 63/102 726/23 |
| 2016/0057045 A1* | 2/2016 | Gustin | H04L 63/02 370/254 |
| 2016/0285824 A1 | 9/2016 | Carames | |
| 2016/0285912 A1 | 9/2016 | Carames | |
| 2017/0034179 A1 | 2/2017 | Carames | |
| 2017/0118181 A1 | 4/2017 | Reese | |
| 2017/0163687 A1 | 6/2017 | Carames | |
| 2017/0257374 A1 | 9/2017 | Carames | |
| 2018/0048627 A1 | 2/2018 | Reese | |
| 2018/0139179 A1 | 5/2018 | Ettema et al. | |

OTHER PUBLICATIONS

U.S. Appl. No. 14/665,315 Final Office Action dated Mar. 1, 2017.
U.S. Appl. No. 14/665,315 Office Action dated Aug. 11, 2016.
U.S. Appl. No. 14/666,180 Final Office Action dated Aug. 22, 2016.
U.S. Appl. No. 14/666,180 Office Action dated Apr. 28, 2016.
U.S. Appl. No. 15/434,603 Office Action dated Mar. 24, 2017.
U.S. Appl. No. 14/815,866 Final Office Action dated Jun. 21, 2017.
U.S. Appl. No. 14/815,866 Office Action dated Jan. 12, 2017.
U.S. Appl. No. 15/602,483 Final Office Action dated Nov. 30, 2017.
U.S. Appl. No. 15/602,483 Office Action dated Jun. 22, 2017.
U.S. Appl. No. 14/665,315 Final Office Action dated Jun. 4, 2018.

* cited by examiner

| \# 300 | NAME 305 | DESCRIPTION 310 | ADOPTION 315 | CONCL 320 | POLICY 325 | EXAMPLE 330 |
|---|---|---|---|---|---|---|
| | | DATABASE OF WELL-KNOWN RFC EXCEPTIONS 140 | | | | |
| 340 | HTTP Variant A | Variant of HTTP with line feed replacing carriage return | 1.2m encounters | Safe | Treat like HTTP | 📎 packet_340 |
| 345 | HTTP Variant B | Variant of HTTP using data compression | 573k encounters | Safe | Treat like HTTP | 📎 packet_345 |
| 350 | Custom instant message protocol | Custom protocol for instant messaging | 205k encounters | Mostly Safe | Treat like SMTP + antivirus | 📎 packet_350 |
| 355 | Custom unknown protocol | Custom commonly used protocol of uncertain origin | 12k encounters | Unclear | Scan for antivirus + malware then allow | 📎 packet_355 |
| 360 | FTP Variant A | Variant of FTP with additional garbled characters at end | 103k encounters | Mostly Safe | Treat like FTP + antivirus | 📎 packet_360 |
| 365 | TELNET Variant A | Variant of TELNET with additional encryption layer | 59k encounters | Safe | Treat like TELNET | 📎 packet_365 |

Fig. 3

| DATABASE OF UNCLASSIFIED NON-RFC-COMPLIANT PROTOCOLS 135 ||||||
|---|---|---|---|---|---|
| # 400 | NAME 405 | SENDER 410 | RECIPIENT 415 | STATUS 420 | PACKET 425 |
| 440 | FTP Variant A | SENDER A | RECIPIENT A | Quarantined | packet_440 |
| 445 | FTP Variant B | SENDER A | RECIPIENT B | Examined - dangerous | packet_445 |
| 450 | SMTP Variant A | SENDER B | RECIPIENT A | Quarantined | packet_450 |
| 455 | HTTP Variant A | SENDER C | RECIPIENT C | Examined - safe | packet_455 |
| 460 | Unknown protocol A | SENDER B | RECIPIENT C | Quarantined | packet_460 |
| 465 | TELNET Variant A | SENDER D | RECIPIENT B | Examined - modest adoption | packet_465 |

NON RFC-COMPLIANT PROTOCOL CLASSIFICATION BASED ON REAL USE

CROSS REFERENCE TO RELATED APPLICATIONS

This application is a continuation and claims the priority benefit of U.S. patent application Ser. No. 15/434,603 filed Feb. 16, 2017, now U.S. Pat. No. 9,838,357, which is a continuation and claims the priority benefit of U.S. patent application Ser. No. 14/666,180 filed Mar. 23, 2015, now U.S. Pat. No. 9,608,959, the disclosures of which are incorporated herein by reference.

BACKGROUND

1. Field of the Invention

The present invention generally relates to computer network firewall systems. More specifically, the present invention relates to treatment of non-RFC-compliant traffic by computer network firewall systems.

2. Description of the Related Art

Typically, firewall systems accept incoming data, filter through the incoming data to identify and block potentially dangerous incoming data, and allow transmission of only data that is safe to transmit. Some firewalls also include policies that automatically perform antivirus scans of data that the firewall has deemed to be otherwise allowable, which may further be used to block dangerous data.

In order to identify potentially dangerous incoming data, some firewalls determine the protocol of the incoming data (i.e., using a "protocol decoder" module). Some firewalls then apply antivirus policies based on the protocol of the incoming data (e.g., for incoming data using the Hypertext Transfer Protocol, allow transmission of the data if cleared by an antivirus scan). Some firewalls also apply traffic blocking policies based on the protocol of the incoming data (e.g., block all incoming data using a Telnet Protocol).

Incoming data may use one of a variety of protocols. In some cases these protocols are standard protocols, such as protocols complying with Request for Comments (RFC) standards; in other cases, these do not match a standard protocol. Standard protocols that comply with Request for Comments (RFC) standards may include Internet Protocol (IP), Internet Control Message Protocol (ICMP), Transmission Control Protocol (TCP), User Datagram Protocol (UDP), Telnet Protocol (TELNET), File Transfer Protocol (FTP), Simple Mail Transfer Protocol (SMTP), Network News Transfer Protocol (NNTP), Hypertext Transfer Protocol (HTTP), Remote Framebuffer Protocol (RFP), Internet Key Exchange Protocol (IKE), and variants of these protocols implementing Transport Layer Security (TLS) or Secure Socket Layer (SSL). Non-standard protocols are sometimes benign variants of these RFC-compliant standard protocols, or are sometimes dangerous protocols designed to circumvent firewall policies or protections in order to damage a firewall, a network, or a receiving system.

Typically, when a firewall receives incoming data using a protocol that is not a standard (i.e., RFC-compliant) protocol, the firewall either blocks the incoming data or allows the incoming data. Blocking the incoming data because it uses a non-standard (i.e., non-RFC-compliant) protocol allows for higher security, but in practice can often block commonly-used communications and break functionality of commonly-used software applications at a recipient computer. Allowing the incoming data—even though a non-standard (i.e., non-RFC-compliant) protocol is used—allows commonly used communications through and preserves functionality of software applications at the recipient computer, but can also allow potentially dangerous incoming data to get through the firewall. In some cases, potentially dangerous incoming data may be able to circumvent additional security measures such as a firewall's antivirus policies. For example, an incoming data packet using a protocol that is a slight variant of the HTTP protocol might be allowed by a firewall without an antivirus scan, despite an antivirus policy that dictates that all incoming data using an HTTP protocol should only be allowed after an antivirus scan is cleared.

As a result, typical firewalls are either insecure due to allowance of data using non-standard protocols (and potential circumvention of firewall security policies), or are too restrictive in blocking all data using non-standard protocols (which also blocks commonly-used communications and thus breaks functionality of commonly-used software applications at a recipient computer).

There is, therefore, a need in the art for improved firewall systems.

SUMMARY OF THE PRESENTLY CLAIMED INVENTION

In an exemplary method, a firewall may receive a first data packet over a communications network communicatively coupled to the firewall. The firewall may determine at the firewall that a protocol of the first data packet does not match any of a set of standard protocols previously identified as compliant with Request for Comments (RFC) standards as maintained in a memory of the firewall device. The firewall may determine that the protocol of the first data packet matches a first RFC-exception protocol of a set of RFC-exception protocols stored at an RFC-exception data store. The firewall may then transmit the first data packet to a recipient system according to a firewall policy associated with the protocol of the first data packet, based on the associated firewall policy not prohibiting transmission of data traffic using the protocol of the first data packet.

Other embodiments may include systems including a firewall and a support system. The firewall, when executed by a processor, may receive a first data packet over a communications network communicatively coupled to the firewall. The firewall may determine that a protocol of the first data packet does not match any of a set of standard protocols previously identified as compliant with Request for Comments (RFC) standards, the set of standard protocols maintained in memory of the firewall. The firewall may determine that the protocol of the first data packet does not match any of a set of RFC-exception protocols stored at an RFC-exception data store. The firewall may then transmits the first data packet to a support system. The support system may then receive the first data packet from the firewall and store the first data packet at a quarantine data store. The support system may then add a first RFC-exception protocol based on the protocol of the first data packet to the set of RFC-exception protocols stored at the RFC-exception data store.

Various embodiments of the present invention may further include non-transitory computer-readable storage media, having embodied thereon a firewall program executable by a processor to perform methods described herein.

DETAILED DESCRIPTION

Embodiments of the present invention allow for systems and methods of operating a firewall. A protocol for an incoming data packet may be determined. A determination may be made regarding whether the protocol of the incoming data packet matches a standard protocol compliant with Request for Comment (RFC) standards. If not, a determination may be made regarding whether the protocol of the incoming data packet matches an RFC-exception protocol in an RFC-exception database. If the protocol does match an RFC-exception protocol, the incoming data packet may be transmitted to the recipient computer if additional policies are passed. If the protocol does not match an RFC-exception protocol, the incoming data packet may be transmitted to a support system for analysis.

Figure 1:
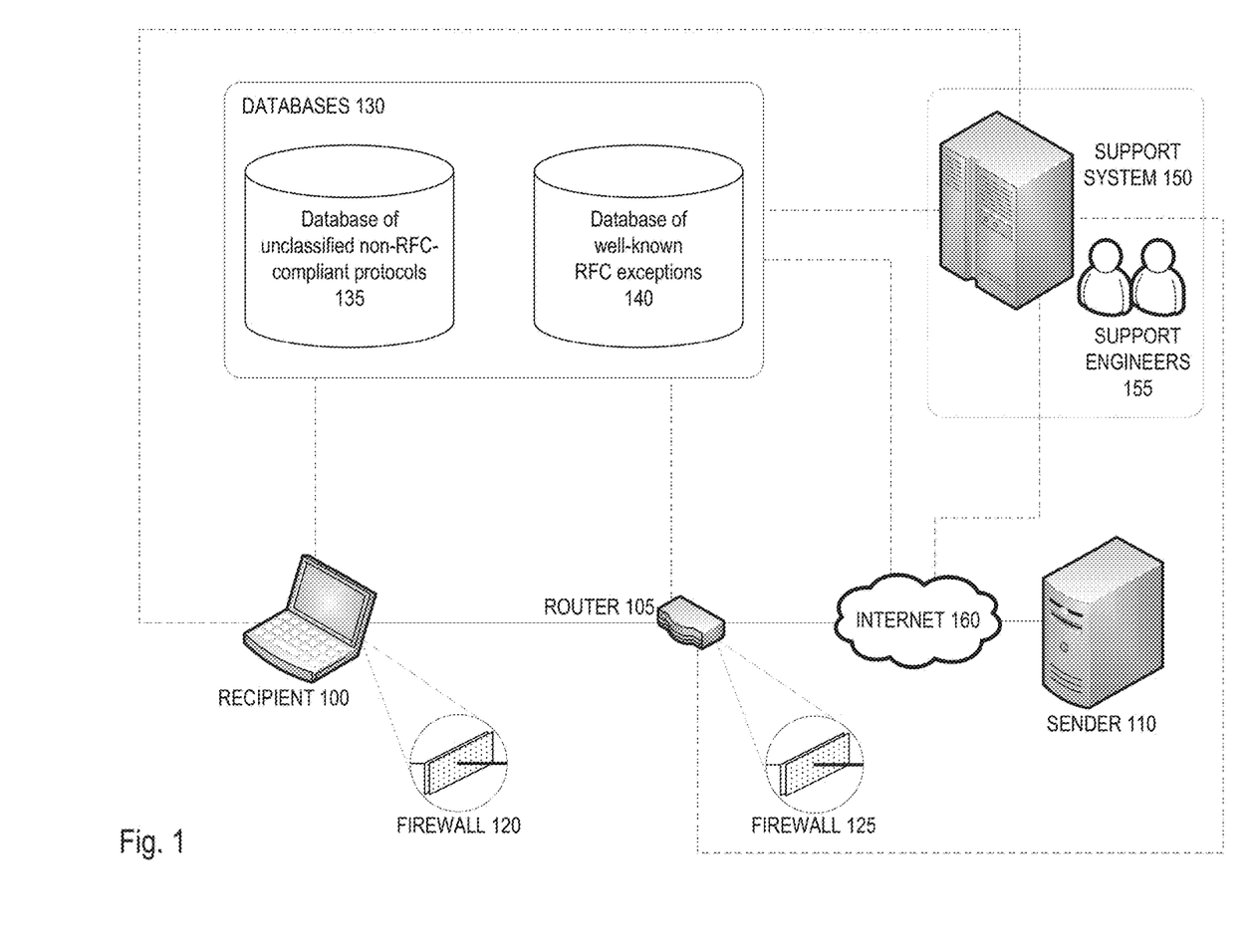
FIG. 1 illustrates an exemplary architecture incorporating an exemplary firewall system with a set of databases.

FIG. 1 illustrates an exemplary architecture incorporating an exemplary firewall system with a set of databases 130. The exemplary firewall system may include a sender system 110, a recipient system 100, and a router 105. Recipient system 100 may include a recipient firewall 120. Router 105 may include a router firewall 125. Both recipient firewall 120 and router firewall 125 may be included in the firewall system. In some embodiments, the router 105 may be missing, and the sender system may 110 be connected directly to recipient system 100, either through the internet 160 or through a direct connection (e.g., where the sender system 110 is in the same internal network as the recipient system 100, or where the sender system 110 and the recipient system 100 are both virtual machines running on the same parent machine).

A support system 150 may also be part of the firewall system. Support system 150 may be connected to one or both of the recipient system 100 and the router 105, either through the internet 160 or through a direct connection.

The set of databases 130 may be accessible by the recipient system 100 and/or the router 105 and/or the support system 150, either through the internet 160 or through a direct connection (e.g., a direct network connection or a direct wired/physical connection). The set of databases 130 may, in some embodiments, be modified by the recipient system 100 and/or the router 105 and/or the support system 150, either through the internet 160 or through a direct connection (e.g., a direct network connection or a direct wired/physical connection). The support system 150 may be accessed by support engineers 155.

Recipient system 100 may be any type of computing device. For example, recipient system 100 may be a smartphone, a tablet, a laptop computer, a desktop computer, a gaming console, a smart television, a home entertainment system, a wearable device, a portable networked media player, a networked appliance, a network device, a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, a virtual machine, a "thin" client, a Redundant Arrays of Independent Disks (RAID) array, or any other type of computing device.

Recipient system 100 may include a variety of components, such as a processor, a memory, a display, a keyboard, a mouse, a touchscreen, a battery, a non-volatile storage system, a hard drive, a basic input/output system (BIOS), a floppy disk reader, a floppy disk writer, a compact disc (CD) reader, a CD writer, a digital versatile disc (DVD) reader, a DVD writer, a high-definition digital versatile disc (HD-DVD) reader, an HD-DVD writer, a Blu-Ray disc reader, a Blu-Ray disc writer, a holographic disc reader, a holographic disc writer, a wired and/or wireless communication interface (e.g, a USB port module, a FireWire port module, a Lightning port module, a Thunderbolt port module, a Wi-Fi connection module, a 3G/4G/LTE cellular connection module, a BLUETOOTH™ connection module, a BLUETOOTH™ low energy connection module, a BLUETOOTH™ Smart connection module, a near field communication module, a radio wave communications module), and other components. The processor of the recipient system 100 may execute an operating system and a variety of other software elements.

Sender system 110 may be any type of computing device. For example, sender system 110 may be a smartphone, a tablet, a laptop computer, a desktop computer, a gaming console, a smart television, a home entertainment system, a wearable device, a portable networked media player, a networked appliance, a network device, a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, a virtual machine, a "thin" client, a Redundant Arrays of Independent Disks (RAID) array, or any other type of computing device.

Sender system 110 may include a variety of components. For example, sender system 110 may include a processor, a memory, a display, a keyboard, a mouse, a touchscreen, a battery, a non-volatile storage system, a hard drive, a basic input/output system (BIOS), a floppy disk reader, a floppy disk writer, a compact disc (CD) reader, a CD writer, a digital versatile disc (DVD) reader, a DVD writer, a high-definition digital versatile disc (HD-DVD) reader, an HD-DVD writer, a Blu-Ray disc reader, a Blu-Ray disc writer, a holographic disc reader, a holographic disc writer, a wired and/or wireless communication interface (e.g, a USB port module, a FireWire port module, a Lightning port module, a Thunderbolt port module, a Wi-Fi connection module, a 3G/4G/LTE cellular connection module, a BLUETOOTH™ connection module, a BLUETOOTH™ low energy connection module, a, BLUETOOTH™ Smart connection module, a near field communication module, a radio wave communications module), and other components. The processor of the sender system 110 may execute an operating system and a variety of other software elements.

Support system 150 may be any type of computing device. For example, support system 150 may be a smartphone, a tablet, a laptop computer, a desktop computer, a gaming console, a smart television, a home entertainment system, a wearable device, a portable networked media player, a networked appliance, a network device, a structured query language (SQL) server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, a "blade" server, a virtual machine, a "thin" client, a Redundant Arrays of Independent Disks (RAID) array, or any other type of computing device.

Support system 150 may include a variety of components. For example, support system 150 may include a processor, a memory, a display, a keyboard, a mouse, a touchscreen, a battery, a non-volatile storage system, a hard drive, a basic input/output system (BIOS), a floppy disk reader, a floppy disk writer, a compact disc (CD) reader, a CD writer, a digital versatile disc (DVD) reader, a DVD writer, a high-definition digital versatile disc (HD-DVD) reader, an HD-DVD writer, a Blu-Ray disc reader, a Blu-Ray disc writer, a holographic disc reader, a holographic disc writer, a wired and/or wireless communication interface (e.g, a USB port module, a FireWire port module, a Lightning port module, a Thunderbolt port module, a Wi-Fi connection module, a 3G/4G/LTE cellular connection module, a BLUETOOTH™ connection module, a BLUETOOTH™ low energy connection module, a BLUETOOTH™ Smart wireless connection module, a near field communication module, a radio wave communications module), and other components. The processor of the support system 150 may execute an operating system and a variety of other software elements.

In some embodiments, the support system 150 may be a distributed support network system 150 that includes a number of individual computer systems like those described above. In such an embodiment, each computer system of the support network system 150 may include the components described above. Each of these systems may be of a same, similar, or different type than the other computerized systems of the support network system 150.

Although recipient system 100, sender system 110, and support system 150 are each illustrated as different-looking computer systems within the exemplary depiction of FIG. 1, this illustration should be viewed as illustrative rather than limiting. In various embodiments, some or all of these systems may be the same type of system.

Recipient firewall 120 may be a software firewall that takes the form of a program executed by a processor of the recipient computer 100. Alternatively, recipient firewall 120 may be a hardware firewall that is embedded within or coupled to the communication interface of the recipient computer 100. In further embodiments, the recipient firewall 120 may be a combined firewall that includes hardware firewall elements and software firewall elements.

Router firewall 125 may be a software firewall that takes the form of a program executed by a processor of the recipient computer 100. In other embodiments, router firewall 125 may be a hardware firewall that is embedded within or coupled to the communication interface of the recipient computer 100. Still further embodiments allow for the router firewall 125 to be a combined firewall that includes hardware firewall elements and software firewall elements.

The firewall system may also include databases 130. Reference to the term "database" or "databases" herein may include any data structure that can hold data about one or more entities, such as a database, a table, a list, a matrix, an array, an array list, a tree, a hash, a flat file, an image, a queue, a heap, a memory, a stack, a set of registers, or a similar data structure.

The databases 130 of FIG. 1 may include a database of unclassified non-RFC-compliant protocols 135 and a database of well-known RFC exceptions 140. In some embodiments, the data from the database of unclassified non-RFC-compliant protocols 135 and from the database of well-known RFC exceptions 140 may be stored in a single combined database 130.

The databases 130 may be stored in a variety of locations. For example, one or both of the databases 130 may be stored at the recipient system 100. One or both of the databases 130 may be stored at the router 105. One or both of the databases 130 may be stored at the support system 150. In various embodiments, one or both of the databases 130 may be stored at a separate standalone computer system or distributed computer network system.

The contents of one or both databases 130 may be modified by one or more computer systems and/or routers. In particular, at least one of the recipient system 100, the router 105, and/or the support system 150 may modify the contents of one or both of the databases 130. In some embodiments, one or both of the databases 130 may include restrictions preventing one or more of the recipient system 100, the router 105, and/or the support system 150 from performing certain contents-modifying operations (e.g., a restriction on the database of unclassified non-RFC-compliant protocols 135 may allow the recipient system 100 to add new entries, but not remove or edit existing entries).

Figure 2:
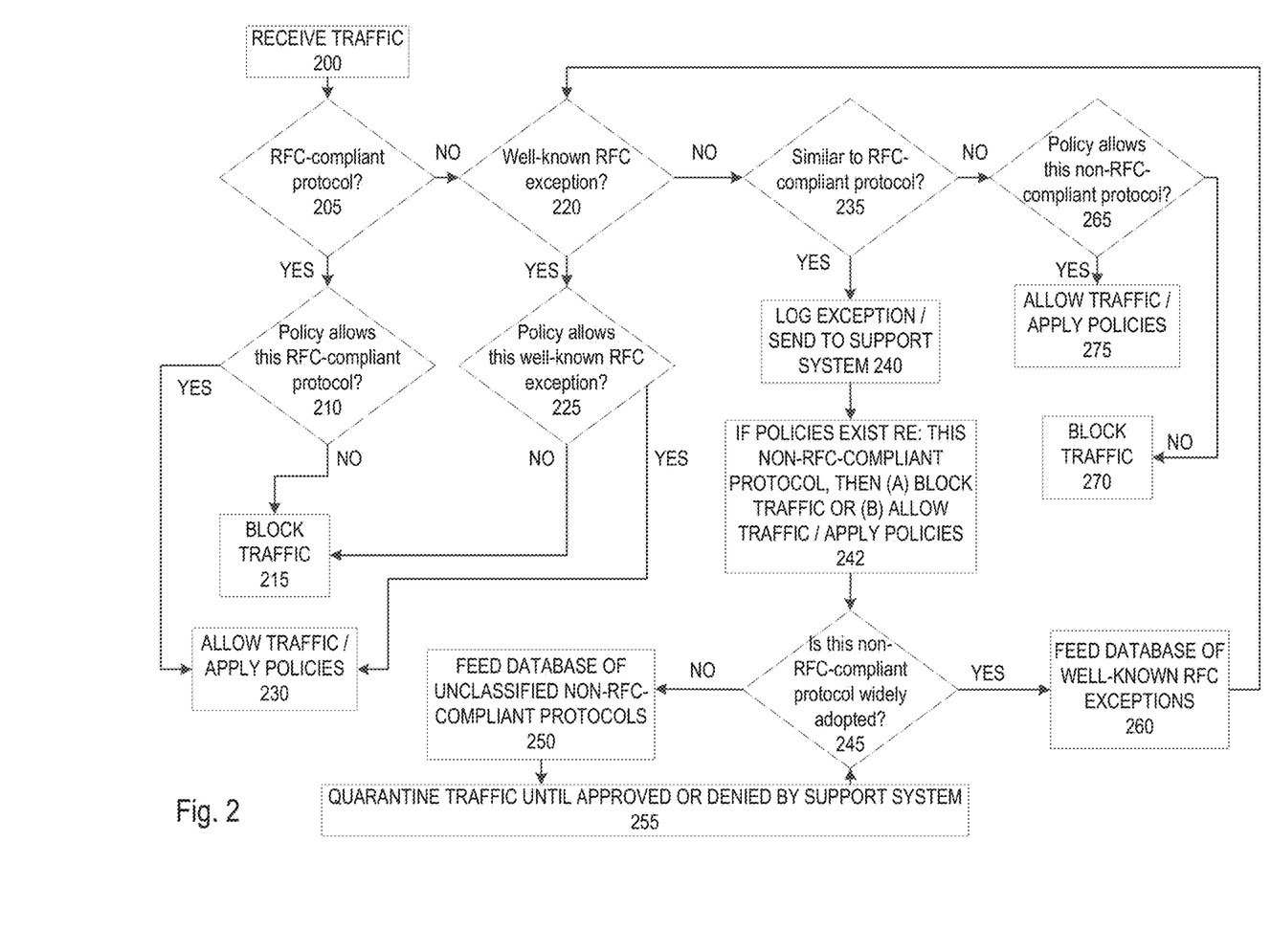
FIG. 2 is a flow diagram illustrating an exemplary operation of an exemplary firewall.

FIG. 2 is a flow diagram illustrating an exemplary operation of an exemplary firewall. The exemplary firewall of FIG. 2 may be representative of recipient firewall 120, of router firewall 125, or of both recipient firewall 120 and router firewall 125.

In step 200, the exemplary firewall illustrated in FIG. 2 first receives an incoming network traffic data packet. This may be received through a direct connection with the sender system 110 or through an internet connection 160.

In step 205, the exemplary firewall then determines the protocol of the received data packet, and determines if the protocol of the received packet is a standard RFC-compliant protocol. In order to do so, the firewall may check against an internal or external list or database (not shown) of standard RFC-compliant protocols. In one embodiment, this list or database (not shown) of standard RFC-compliant protocols may include the Internet Protocol (IP), Internet Control Message Protocol (ICMP), Transmission Control Protocol (TCP), User Datagram Protocol (UDP), Telnet Protocol (TELNET), File Transfer Protocol (FTP), Simple Mail Transfer Protocol (SMTP), Network News Transfer Protocol (NNTP), Hypertext Transfer Protocol (HTTP), Remote Framebuffer Protocol (RFP), Internet Key Exchange Protocol (IKE), and other RFC-compliant protocols. The list or database (not shown) of standard RFC-compliant protocols may also include variants of these protocols that incorporate Transport Layer Security (TLS) or Secure Sockets Layer (SSL), such as HTTP Secure (HTTPS) or Secure FTP (SFTP).

If the firewall determines that the protocol of the data packet is a standard RFC-compliant protocol, the method may proceed to step 210 in which it is determined whether any policies of the firewall block or alter transmission behavior for this particular RFC-compliant protocol. For example, the firewall may block a particular RFC-compliant protocol or set of protocols (e.g., block all incoming traffic using the TELNET protocol). If a policy indicates that traffic using the protocol of the data packet should be blocked, the method may proceed to step 215 in which the data packet is blocked. If no such policy exists, the method may proceed to step 230 in which any other policies (e.g., scan traffic with an antivirus before allowing) are applied and the data packet is allowed.

If the firewall determines that the protocol of the data packet is not a standard RFC-compliant protocol, the method may proceed to step 220 in which it is determined whether the protocol of the data packet is a well-known RFC exception. To do this, the firewall checks the database of well-known RFC exceptions 140. If the protocol of the data packet is a well-known RFC exception, the method may proceed to step 225 in which the firewall then checks whether any policies of the firewall block or alter transmission of this particular well-known RFC exception protocol. For example—the firewall may block a particular well-known RFC exception protocol or set of protocols (e.g., block all incoming traffic using a well-known variant of the TELNET protocol). If a policy indicates that traffic using the protocol of the data packet should be blocked, the method may proceed to step 215 in which the data packet is blocked. If no such policy exists, the method may proceed to step 230 in which any other policies (e.g., scan traffic with an antivirus before allowing) are applied and the data packet is allowed.

If the firewall determines that the protocol of the data packet is not a well-known RFC exception, the method may proceed to step 235 in which it is determined whether the protocol of the data packet is similar to an RFC-compliant protocol. For instance, if the RFC standard dictates that data packets using the HTTP protocol must end with two carriage return (CR) characters, but the protocol of the data packet instead ends with a line feed (LF) character, the firewall may determine that the protocol of the data packet is similar to an RFC-compliant protocol.

If the firewall determines that the protocol of the data packet is similar to an RFC-compliant protocol, the method may proceed to step 240 in which the firewall may log an exception and send the data packet on to a support system 150. The firewall may also check whether any policies of the firewall block or alter transmission behavior for this particular non-RFC-compliant protocol (that is similar to an RFC-compliant protocol) in step 242. If the firewall determines that a policy allows the non-RFC compliant protocol of the data packet, then any other policies (e.g., scan traffic with an antivirus before allowing) are applied and the data packet is allowed. If the firewall determines that no policy allows the non-RFC compliant protocol of the data packet, then the data packet is blocked. Regardless of whether or not a policy is found in step 242, the process moves on to step 245. In step 245, the support system 140 may then determine whether the protocol of the data packet is a widely adopted non-RFC-compliant protocol.

If the support system 140 determines that the protocol of the data packet is not a widely adopted non-RFC-compliant protocol at step 245, the method may proceed to step 250 in which the support system 140 may feed the data packet into a database of unclassified non-RFC-compliant protocols 135. In step 255, the support system 140 may then quarantine the data packet by keeping the quarantined data packet stored in the database of unclassified non-RFC-compliant protocols 135 until approved or denied by the support system 150. Approval or denial by the support system 150 may include, for example, analysis of the data packet and/or the non-RFC-compliant protocol of the data packet by one or more support engineers 155. Approval or denial by the support system 150 may also include receiving other traffic using the same non-RFC-compliant protocol of the data packet. In step 245, the support system 140 may then (e.g., periodically) revert to determining whether the protocol of the data packet is a widely adopted non-RFC-compliant protocol.

If the firewall determines in step 245 that the protocol of the data packet is a widely adopted non-RFC-compliant protocol, the firewall may feed an entry corresponding to the protocol of the data packet into the database of well-known RFC exceptions 130 in step 260. In step 220, the firewall may then revert to the process of determining whether the protocol of the data packet is a well-known RFC exception, which the firewall may then find and subsequently allow or deny based on any further policies stored at the firewall in step 225.

If the firewall determines in step 235 that the protocol of the data packet is not similar to an RFC-compliant protocol, the firewall may then determine whether any policy stored by the firewall specifically allows the use of the protocol of the data packet in step 265. For example, an engineer running a custom local area network (LAN) may decide to use a custom protocol that is more efficient, but non-RFC-compliant within his LAN. In order to allow traffic using this custom protocol, the engineer may manually produce a policy exception for his custom protocol. If the firewall determines that a policy allows the non-RFC compliant protocol of the data packet, then any other policies (e.g., scan traffic with an antivirus before allowing) are applied and the data packet is allowed in step 275. If the firewall determines that no policy allows the non-RFC compliant protocol of the data packet, then the data packet is blocked in step 270.

While the flow diagram in FIG. 2 shows a particular order of operations performed by certain embodiments of the invention, it should be understood that such order is exemplary (e.g., alternative embodiments can perform the operations in a different order, combine certain operations, overlap certain operations, etc.).

Figure 3:
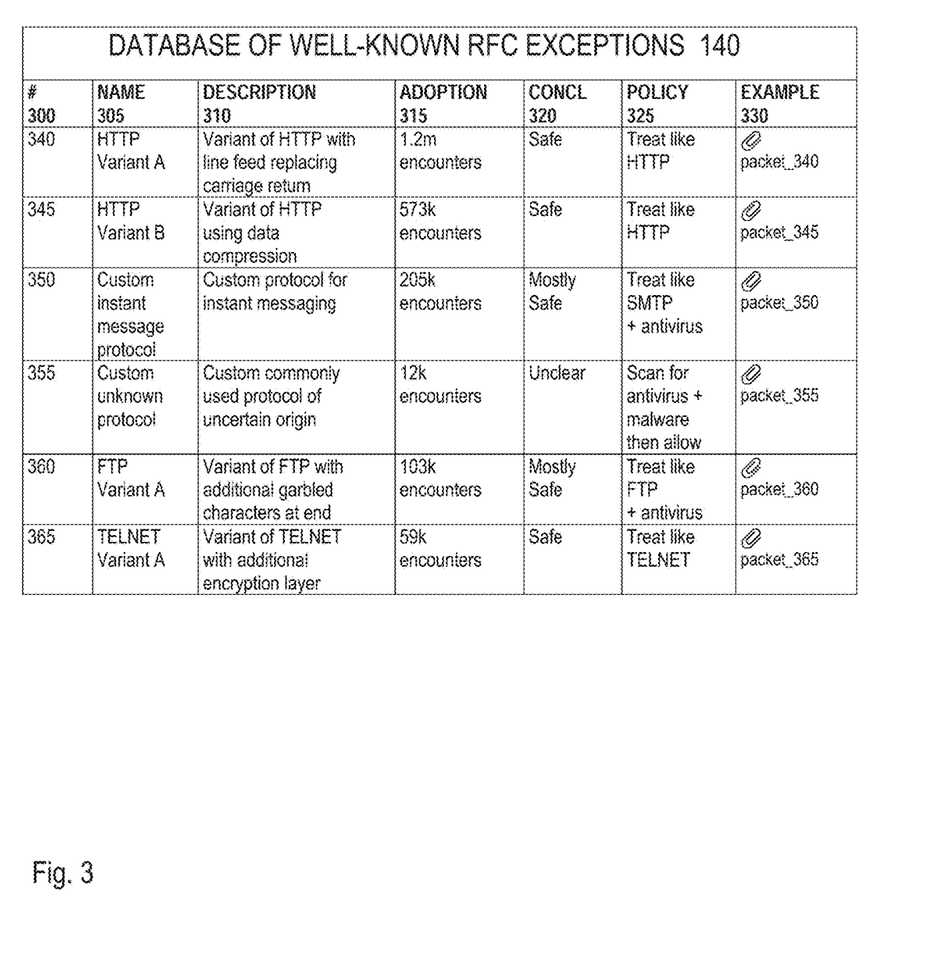
FIG. 3 is an exemplary database of well-known RFC exceptions including exemplary data.

FIG. 3 is an exemplary database of well-known RFC exceptions 140 including exemplary data. In this embodiment, the database stores data regarding a protocol entry number 300, a name or identifier for each protocol 305, a description of each protocol 310, an adoption rate for each protocol 315, a conclusion regarding each protocol 320, a recommended policy for each protocol 325, and an example data packet using each protocol 330. Other embodiments of the database of well-known RFC exceptions 140 may include additional or different categories of data, or may be missing categories of data that are present. Another embodiment may, for example, be organized by data packet rather than by protocol (e.g., as in the exemplary embodiment of the database of unclassified non-RFC compliant protocols 135 in FIG. 4).

The exemplary data in the exemplary database of well-known RFC exceptions 140 of FIG. 3 includes six entries. Entry 340 and 345 are variants of the HTTP protocol (see name column 305), one using a line feed (LF) instead of a carriage return (CR), and the other using a data compression technique (see description 310). Both are relatively well-adopted, at 1.2 million protocol encounters and 573,000 protocol encounters respectively (see adoption column 315). Both protocols have been determined to be safe (see conclusion column 320) using a software analysis of the protocol by the support system 150, a hardware analysis of the protocol by the support system 150, a human analysis of the protocol by support engineers 155, or some combination thereof. The recommended firewall policy for both protocols (see policy column 325) is to treat data traffic using these protocols the same way that a firewall would treat data traffic using an HTTP protocol. This means that if the firewall has a policy to scan all HTTP data traffic using an antivirus, then it should scan this data traffic using the antivirus as well. If the firewall has a policy to block all HTTP data traffic, it should block this data traffic as well. Finally example data packets are provided for both protocols (see example column 330). Examples may be attached/stored at the database of well-known RFC exceptions 140, or on the same machine as the database of well-known RFC exceptions 140 is stored on, or may simply be a link or pointer to an example data packet located elsewhere. In some embodiments, examples are given of only the protocol, but not of a sample data packet. Example data packets may be edited or purged of some data before being stored or pointed to by a database of well-known RFC exceptions 140, such as purging identifying data or message data.

Protocols 350 and 355 are more custom protocols (see name column 305 and description column 310), which in some embodiments may also be included in a database of well-known RFC exceptions 140. Protocol 350 is fairly well-adopted at 205 k protocol encounters, while protocol 355 is somewhat more modestly adopted at only 12 k protocol encounters (see adoption column 315). There is no explicit lower bound on what may be considered a "well-adopted" protocol. In some embodiments, two encounters with the protocol may be enough to decide that the protocol is "well-adopted," while in other encounters, the protocol might not be judged to be "well-adopted" until well over a million encounters with the protocol are recorded by the database of well-known RFC exceptions 140. Protocol 350 has been judged to be "Mostly Safe," (see conclusion column 320), with a recommended policy to treat data traffic using the protocol like data traffic using an SMTP protocol, though with an additional antivirus scan (if data traffic using the SMTP protocol does not already have an antivirus policy). Similarly, the safety of protocol 355 has been judged to be "unclear," (see conclusion column 320), with a recommended policy to run the data traffic through an antivirus scan and a malware scan before allowing the data traffic through. Examples of both are given (see example column 330).

Protocols 360 and 365 are also RFC protocol variants, namely of the FTP and TELNET protocols (see name column 305 and description column 310). Both are somewhat well-adopted at 103,000 protocols encounters and 59,000 protocol encounters respectively (see adoption column 315). Protocol 360 is judged to be "Mostly Safe," (see conclusion column 320), and, like protocol 350, recommends a policy of additional antivirus on top of any FTP policies (assuming the FTP policy does not already include an antivirus scan) (see policy column 325). Protocol 365 is judged to be "Safe," (see conclusion column 320), and recommends a policy of treating data traffic using the protocol the same way that data traffic using a TELNET protocol would be treated (see policy column 325). Examples of both are given (see example column 330).

Figure 4:
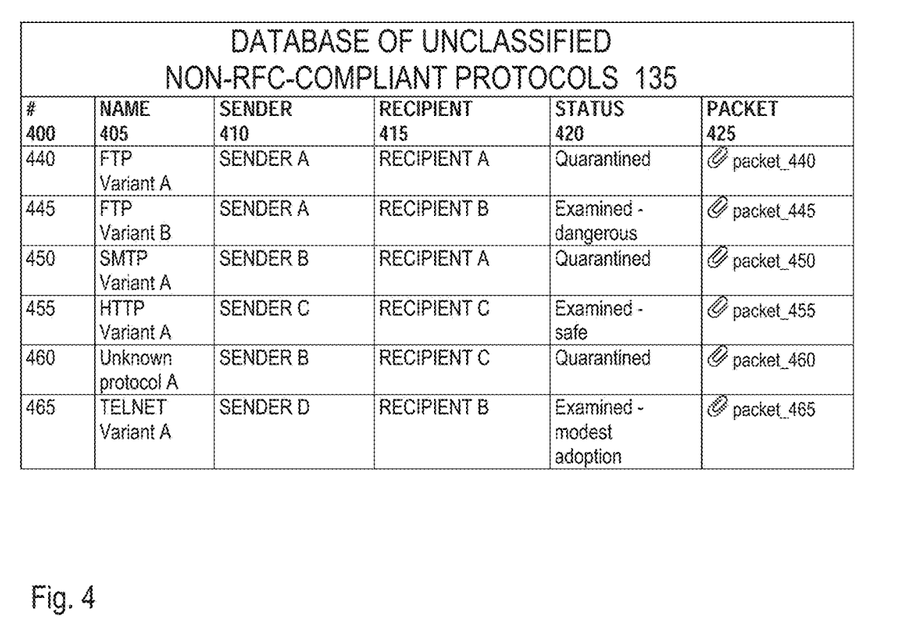
FIG. 4 is an exemplary database of unclassified non-RFC compliant protocols including exemplary data.

FIG. 4 is an exemplary database of unclassified non-RFC compliant protocols 135 including exemplary data. In this embodiment, the database stores data regarding a data packet entry number 300, a name or identifier for a protocol of the data packet 305, a sender identifier 310, a recipient identifier 315, a status regarding the data packet's protocol 320, and the data packet 435. Other embodiments of the database of unclassified non-RFC compliant protocols 135 may include additional or different categories of data, or may be missing categories of data that are present. Another embodiment may, for example, be organized by protocol rather than by data packet (e.g., as in the exemplary embodiment of the database of well-known RFC exceptions 140 in FIG. 3).

The database of unclassified non-RFC compliant protocols 135 may include, for example, data packets 440 and 445, which may use variants of an FTP protocol (see name column 405) (e.g., determined at the process of block 235 of FIG. 2). Senders and recipients are listed for both (see sender column 410 and recipient column 415). Data packet 440 may be quarantined (see status column 420) and awaiting analysis (e.g., using a software analysis of the protocol by the support system 150, a hardware analysis of the protocol by the support system 150, a human analysis of the protocol by support engineers 155, or some combination thereof). Data packet 445 may have already been analyzed/examined (e.g., using a software analysis of the protocol by the support system 150, a hardware analysis of the protocol by the support system 150, a human analysis of the protocol by support engineers 155, or some combination thereof) and determined to use a dangerous protocol. The data packets themselves are them provided (see packet column 425). The packets may be attached/stored at the database of unclassified non-RFC compliant protocols 135, or on the same machine as the database of unclassified non-RFC compliant protocols 135 is stored on, or may simply be a link or pointer to the data packet, which is located elsewhere. In some embodiments, only the protocol portions are attached, but not the remainder of the data packet. In some embodiments, the data packets may be edited or purged of some data before being stored or pointed to by a database of unclassified non-RFC compliant protocols 135, such as purging identifying data or message data.

The database of unclassified non-RFC compliant protocols 135 may also include, for example, data packets 450 and 455, which may use variants of the SMTP protocol and HTTP protocol, respectively (see name column 405) (e.g., determined in step 235 of the exemplary method illustrated in FIG. 2). Senders and recipients are listed for both (see sender column 410 and recipient column 415). Data packet 450 may be quarantined (see status column 420) and awaiting analysis. Data packet 455 may have already been analyzed/examined (e.g., using a software analysis of the protocol by the support system 150, a hardware analysis of the protocol by the support system 150, a human analysis of the protocol by support engineers 155, or some combination thereof) and determined to use a safe protocol. The data packets themselves are them provided (see packet column 425).

The database of unclassified non-RFC compliant protocols 135 may also include, for example, data packets 460 and 465, which may use an unknown protocol and a variant of the TELNET protocol, respectively (see name column 405) (e.g., determined at the process of block 235 of FIG. 2). Senders and recipients are listed for both (see sender column 410 and recipient column 415). Data packet 460 may be quarantined (see status column 420) and awaiting analysis. Data packet 465 may have already been analyzed/examined (e.g., using a software analysis of the protocol by the support system 150, a hardware analysis of the protocol by the support system 150, a human analysis of the protocol by support engineers 155, or some combination thereof) and determined be modestly well-adopted (i.e., if the protocol is encountered a few more times, it might be judged as "widely-adopted" as in step 245 of the exemplary method illustrated in FIG. 2 and eventually added to the database of well-known RFC-exceptions 140). The data packets themselves are them provided (see packet column 425).

Note that no analysis is given for packet 465 regarding the safety of the protocol, as may be present in some embodiments. That is, some embodiments of the invention may use widespread adoption as the sole requirement for a protocol to be added to the database of well-known RFC-exceptions 140. Conversely, some embodiments of the invention may use a determined safety of a protocol as the sole requirement for the protocol to be added to the database of well-known RFC-exceptions 140. In yet other embodiments, both safety and widespread adoption may be considerations about a protocol before the protocol is granted an entry into the database of well-known RFC-exceptions 140 (e.g., and removal of one or more corresponding entries in the database of unclassified non-RFC-compliant protocols 135).

Figure 5:
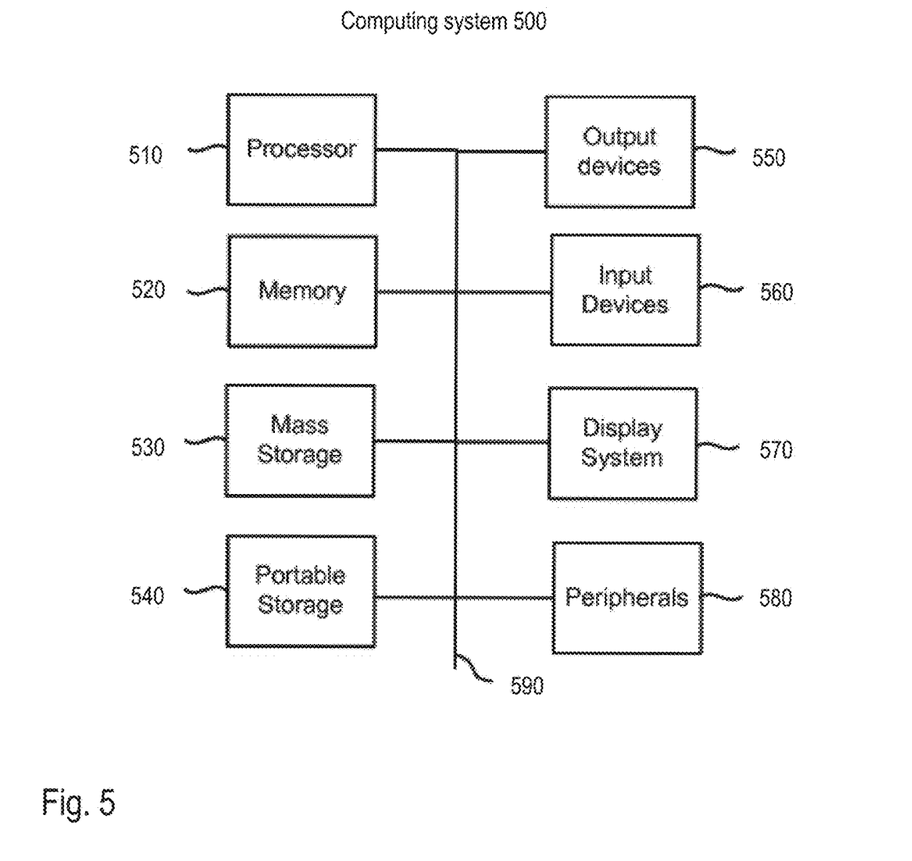
FIG. 5 is a block diagram of an exemplary computing device that may be used to implement an embodiment of the present invention.

FIG. 5 illustrates an exemplary computing system 500 that may be used to implement an embodiment of the present invention. For example, exemplary computing system 500 may be used as recipient system 100, router 105, sender system 110, a database system for storing databases 130, and/or support system 150. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX™, LINUX™, WINDOWS™, MACINTOSH™ OS, PALM™ OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for processing data packets, the method comprising:
   receiving a first data packet associated with a first set of communication traffic sent to a recipient computer via a computer network;
   identifying that a protocol of the first data packet is not compliant with a standard communication protocol, wherein the first data packet is not associated with an exception rule associated with the standard communication protocol, and wherein the first data packet includes a characteristic that resembles without being identical to one or more characteristics associated with the standard communication protocol;
   sending the first data packet to a support system for analysis, wherein the analysis identifies whether the first set of communication traffic is approved or denied to be sent to the recipient computer;
   quarantining the first set of communication traffic until the support system approves or denies the first set of communication traffic based on the analysis of at least the first data packet; and
   receiving an indication from the support system that the first set of communication traffic is approved to be sent to the recipient computer, wherein the first set of communication traffic is allowed to proceed to the recipient computer via the computer network based on the indication.

2. The method of claim 1, further comprising:
   storing the first data packet in a database of unclassified non-compliant protocols;
   classifying the protocol associated with the first data packet as a known protocol based on the approval of the first set of communication traffic;
   creating a new exception rule based on the classification of the protocol associated with the first data packet as the known protocol; and
   storing the new exception rule in an exception rule database.

3. The method of claim 2, further comprising:
   receiving a second data packet associated with a second set of communication traffic;
   identifying that the second data packet is associated with the new exception rule based on a protocol associated with the second data packet being consistent with the protocol of the first data packet; and
   allowing the second set of communication traffic to proceed based at least in part on the identification that the second data packet is associated with the new exception rule.

4. The method of claim 3, further comprising:
   receiving information from a system administrator computer that identifies a custom non-compliant protocol; and
   adding a second new exception rule to the exception rule database that includes the custom non-compliant protocol, wherein communication traffic associated with data packets sent according to the custom non-compliant protocol are allowed based at least in part on the second new exception rule being added to the exception rule database.

5. The method of claim 3, further comprising:
   receiving a third data packet associated with a third set of communication traffic; and
   identifying that a policy allows the third set of communication traffic to proceed based on a protocol of the third data packet being associated with a custom non-compliant protocol exception rule.

6. The method of claim 1, wherein the support system is a remote computer system accessible via the internet.

7. The method of claim 1, wherein the support system analyzes the first data packet to identify whether the first data packet includes malware.

8. The method of claim 1, wherein the support system accesses data in the first data packet to perform the analysis.

9. The method of claim 1, wherein the protocol associated with the first data packet is analyzed by reviewing one or more portions of the first data packet.

10. The method of claim 1, wherein a database of known exceptions stores information related to the known protocol and the database of known exceptions cross-references a protocol identifier with one or more policies.

11. The method of claim 10, further comprising:
    identifying an action associated with the one or more policies; and
    initiating the identified action.

12. The method of claim 11, wherein the initiated action includes scanning the traffic associated with the first data packet for viruses.

13. The method of claim 2, wherein the database of unclassified non-compliant protocols cross-references a protocol identifier with a status, a status, and one or more data packets.

14. The method of claim 1, wherein traffic associated with a second data packet is blocked based on an action associated with a policy rule.

15. The method of claim 1, wherein traffic associated with a second data packet is blocked based on a policy rule.

16. A non-transitory computer-readable storage medium having embodied thereon a program for implementing a method for processing data packets, the method comprising:
    receiving a first data packet associated with a first set of communication traffic sent to a recipient computer via a computer network;
    identifying that a protocol of the first data packet is not compliant with a standard communication protocol, wherein the first data packet is not associated with an exception rule associated with the standard communication protocol, and wherein the first data packet includes a characteristic that resembles without being identical is similar to one or more characteristics associated with the standard communication protocol;
    sending the first data packet to a support system for analysis, wherein the analysis identifies whether the first set of communication traffic is approved or denied to be sent to the recipient computer;
    quarantining the first set of communication traffic until the support system approves or denies the first set of communication traffic based on the analysis of at least the first data packet; and
    receiving an indication from the support system that the first set of communication traffic is approved to be sent to the recipient computer, wherein the first set of communication traffic is allowed to proceed to the recipient computer via the computer network based on the indication.

17. The non-transitory computer-readable storage medium of claim 16, further comprising instructions executable to:
    store the first data packet in a database of unclassified non-compliant protocols;

classify the protocol associated with the first data packet as a known protocol based on the first set of communication traffic being approved;

create a new exception rule based on the classification of the protocol associated with the first data packet as the known protocol; and store the new exception rule in an exception rule database.

18. The non-transitory computer-readable storage medium of claim 17, further comprising instructions executable to:

receive a second data packet associated with a second set of communication traffic;

identify that the second data packet is associated with the new exception rule based on a protocol associated with the second data packet being consistent with the protocol of the first data packet; and allow the second set of communication traffic to proceed based at least in part on the identification that the second data packet is associated with the new exception rule.

19. The non-transitory computer-readable storage medium of claim 18, further comprising instructions executable to:

receive information from a system administrator computer that identifies a custom non-compliant protocol; and add a second new exception rule to the known exception rule database that includes information that identifies the custom non-compliant protocol, wherein communication traffic associated with data packets sent according to the custom non-compliant protocol are allowed based at least in part on the second new exception rule being added to the known exception rule database.

20. An apparatus for processing data packets, the apparatus comprising:

a network interface that receives a first data packet sent to a recipient computer and associated with a first set of communication traffic;

a memory; and a processor that executes instructions out of the memory to:

identify that a protocol of the first data packet is not compliant with a standard communication protocol, wherein the first data packet is not associated with an exception rule associated with the standard communication protocol, wherein the first data packet includes a characteristic that resembles without being identical to one or more characteristics associated with the standard communication protocol, wherein the first data packet is sent to a support system for analysis of whether the first set of communication traffic is approved or denied to be sent to the recipient computer; and quarantine the first set of communication traffic until the support system approves or denies the first set of communication traffic based on the analysis of at least the first data packet, wherein an indication from the support system that the quarantined traffic associated with the first data packet is approved to be sent to the recipient computer via the network interface and the traffic associated with the first data packet is allowed to proceed to the recipient computer based on the indication.

* * * * *